United States Patent [19]

Kidd

[11] Patent Number: 4,644,354

[45] Date of Patent: Feb. 17, 1987

[54] FLUID DETECTOR

[75] Inventor: Roy E. Kidd, Clayton, Ind.

[73] Assignee: Emhart Industries, Inc., Indianapolis, Ind.

[21] Appl. No.: 747,843

[22] Filed: Jun. 24, 1985

[51] Int. Cl.[4] .......... G08C 15/08

[52] U.S. Cl. .......... 340/870.27; 73/49.2; 340/605

[58] Field of Search .......... 340/870.21, 870.14, 340/602, 603, 604, 605, 517, 518, 521, 870.27; 73/40.5 R, 49.2

[56] References Cited

U.S. PATENT DOCUMENTS 4,221,125 9/1980 Oliver et al. .......... 73/61.1 R 4,586,033 4/1986 Andrejasich .......... 73/49.2 X

*Primary Examiner*—Jerry W. Myracle

*Attorney, Agent, or Firm*—Robert F. Meyer; Carl A. Forest

[57] ABSTRACT

A system for detecting fluid pollutants includes probes for sensing the presence of a polar liquid, a non-polar liquid, and a dry condition, and for producing a polar liquid signal, a non-polar liquid signal, and a dry condition signal. A reference circuit which includes a tunable element, such as a variable resistor, is used to set the probe output signals to a predetermined voltage value: e.g. a 1-volt value indicates a polar liquid, a 2-volt value indicates a non-polar liquid, a 3-volt value indicates a dry state, and a 5-volt value indicates that the circuit is on and operating. The output signals are multiplexed and output on a single output line. The definitive signal levels and the serial output mode permit an inexpensive single channel recorder to be used to provide a permanent and complete record of the probe status.

6 Claims, 2 Drawing Figures

25
21
14
16
20
10
15
18

FLUID DETECTOR

BACKGROUND OF THE INVENTION

1. Field of the Invention.

The invention, in general, relates to devices for detecting the presence of fluids, such as leaking pollutants, and more particularly, a detector which provides an output that can produce complete status records using relatively inexpensive recording devices.

2. Description of the Prior Art.

Contamination of the environment, such as ground water, by various liquid pollutants, such as gasoline, has become a significant problem in recent years and a number of practical devices for detecting pollutants have been developed. See for example, U.S. Pat. No. 4,116,045 on an invention of Bronson M. Potter and U.S. Pat. No. 4,221,125 on an invention of John N. Oliver and Louis M. Sandler. Recording of the output of such detectors has been found to be useful for controlling pollution and, in some cases, has been made necessary by law. Since in some industries and businesses the sources of pollutants can be multitudious, it would be highly desirable that fluids detectors for the sensing of pollutants provide a output that can be utilized by relatively inexpensive recording devices.

U.S. Pat. No. 4,116,045, referred to above, provides as an output an alarm or a gauge that responds to varying current levels. The output disclosed in U.S. Pat. No. 4,221,125, is a voltage which can vary over a range and which activates a visual or audible indicator. In another prior art device which is based on a microprocessor, the output is provided in the form of discrete voltage levels, i.e. an output of one volt indicates the presence of a polar fluid such as water, an output of two volts indicates the presence of a non-polar fluid such as oil, and an output of three volts indicates the presence of a dry well. Such an output lends itself more readily to the creation of a record of the output, however, the microprocessor based device is relatively expensive. Further, for a complete record of the status of all probes, multiple parallel channels must be recorded simultaneously.

SUMMARY OF THE INVENTION

It is an object of the invention to provide a fluid detector which is in itself relatively inexpensive and which provides an output in a form which may be utilized by a relatively inexpensive recording device.

It is another object of the invention to provide a fluid detector which upon the detection of a condition of pollution or other significant status, continuously provides an output indicating the detection of the significant status.

It is still another object of the invention to provide a fluid detector which has a variety of output modes.

The invention provides an apparatus for detecting the presence of fluids comprising, a sensing means for sensing the presence of a polar liquid, a non-polar liquid, and a dry condition and for producing a polar liquid signal, a non-polar liquid signal, and a dry condition signal, each of which signals are capable of assuming at least two levels, i.e. a first level indicative of the absence of the fluid or condition and a second level indicative of the presence of the fluid or condition. The invention further includes a reference means for setting the second level of the polar liquid signal to a first predetermined value, for setting the second level of said non-polar liquid signal to a second predetermined value, and for setting the second level of the dry condition signal to a third predetermined value. There is also a clock means for producing a timing signal, and an output means responsive to the timing signal for sequencing the polar liquid signal, the non-polar liquid signal, and the dry condition signal on a single output line. Preferably the invention further includes a locking means for locking the signal on the output line at the second predetermined value when the non-polar liquid is detected. The invention also preferably includes a means for changing the frequency of the timing signal. Preferably, the reference means includes a variable resistor having a wiper, and a comparator wired in a voltage follower mode, the wiper of the variable resistor connected to the input of the comparator.

The fluid detector, according to the invention, provides an output which may be utilized by a relatively inexpensive single channel recorder, or other simple and inexpensive recording devices, without degredation of the data.

Numerous other features, objects and advantages of the invention will become apparent from the following detailed description when read in conjunction with the accompanying drawings.

DESCRIPTION OF THE PREFERRED EMBODIMENT

Figure 1:
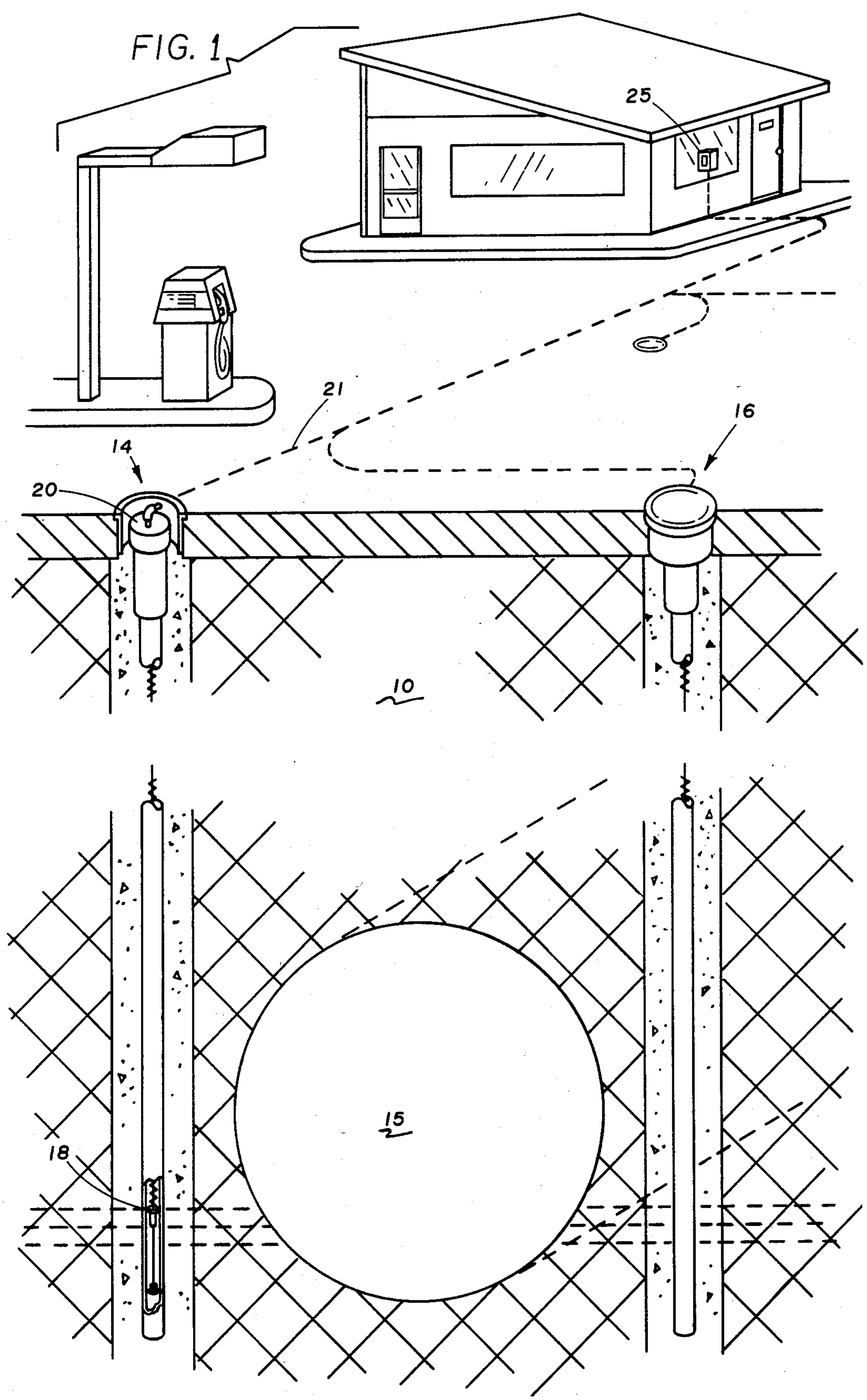
FIG. 1 is a diagramatic view of the invention in its operating environment.

Directing attention to FIG. 1, a partially sectioned view of the invention as it may be installed at a service station, a typical operating environment. In the foreground 10 is a partial sectional view of the underground environment showing probe assemblies 14 and 16 on either side of a gasoline storage tank 15. Probe 18 at the lower end of the probe assembly 14 senses the presence of a dry condition, a non-polar liquid, or a polar liquid and produces a signal which is processed by electronics 20 packaged in the end of the probe to produce signals indicating the presence or absence of a dry condition, a non-polar liquid, and a polar liquid, which signals are passed along cable 21 to a central monitor station 25. As will be discussed in detail below, electronics within central monitor station 25 processes the three signals and produces a recordable output. This output may be recorded on a nearby recording device (not shown) or communicated to a recording device at a distance, as for example, over a telephone line. The probe assemblies, such as 14, may be commercially available units such as any of parts No. FD221G, FD241G, or FD221T available from Pollulert Systems, Mallory Components Group, P. O. Box 706, Indianapolis, Ind. 46206, and the cable 21 may be the commercially available cable such as part No. POL304 or part No. POL314 available from the same source.

Figure 2:
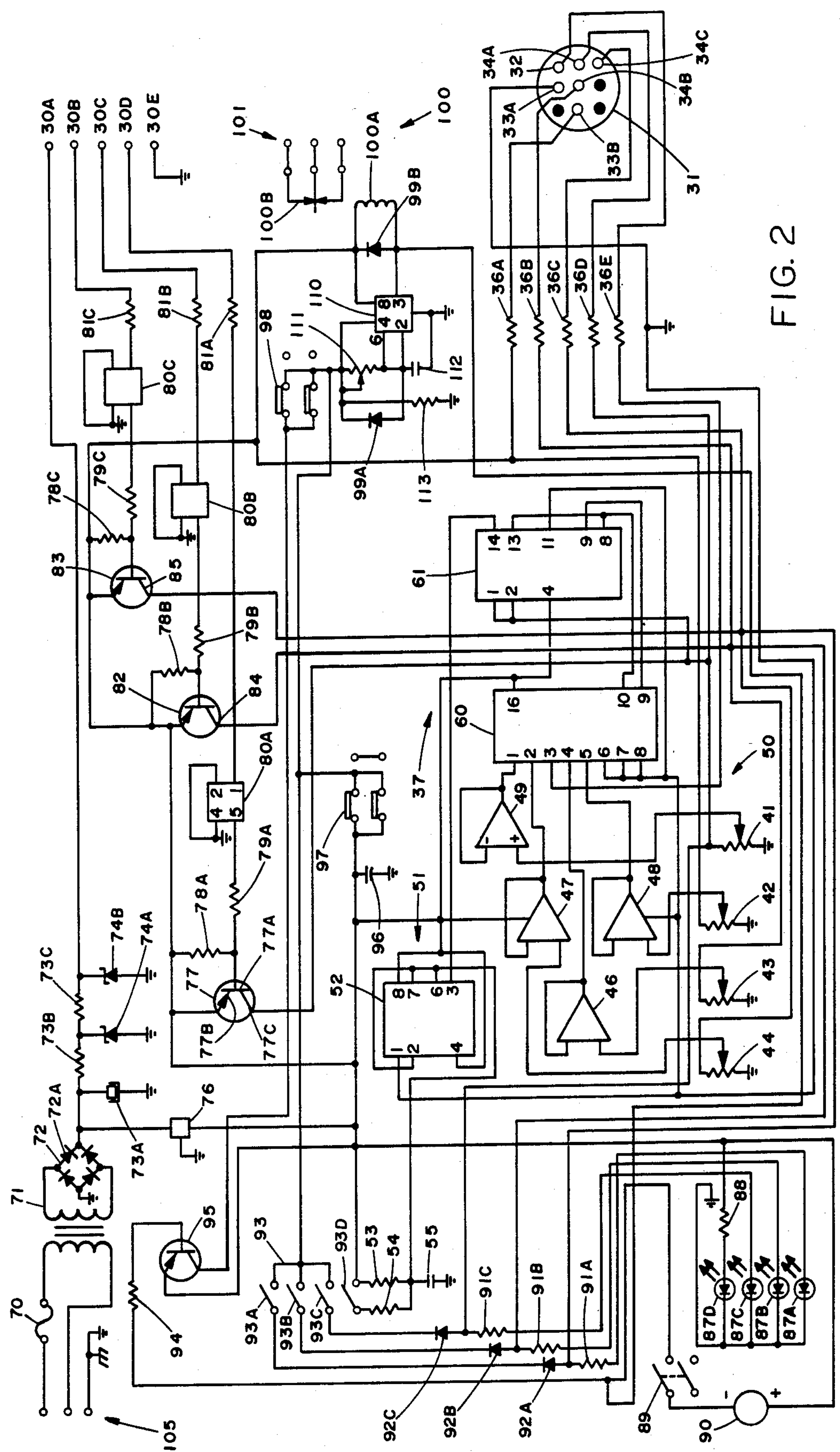
FIG. 2 is an electronic circuit diagram of the central monitor portion of the invention.

Turning now to the detailed description of the electronic circuitry of the central processing station 25 according to the invention, we refer to FIG. 2. The terminals 30A through 30E are the connections to the cable 21 of FIG. 1. Terminal 30A is the probe power supply output and terminals 30B through 30D are the probe condition status inputs. In the preferred embodiment, the status conditions that these inputs report are air, water, and oil for terminals 30B, 30C and 30D, respectively. Terminal 30E connects to the cable shield and the terminal is grounded to provide a common ground for the entire system.

Electronic parts in the preferred embodiment of the invention include an AMP CPC connector plug 31 having output pins 32, 33A, 33B, and 34A through 34C, 180K ohm resistors 36A through 36E, 1OK ohm variable resistors 41 through 44, comparators 46 through 49, which in this embodiment are part of a single integrated chip type LM2902N, integrated circuit chip 52 which in this embodiment is a type LM555 timer, 4.7 M ohm resistor 53, 47K ohm resistor 54, 100 microfarad capacitor 55, integrated circuit chip 60, which in this embodiment is a type CD4052 multiplexer, and integrated circuit chip 61, which is preferably a type MM74C93N counter. The preferred circuit also includes fuse 70, transformer 71, full-wave bridge rectifier 72 which includes four type 1N4001 diodes, such as 72A, 500 microfarad capacitor 73A, two type 1N5352A diodes 74A and 74B, a type LM140K-12 voltage regulator 76, four type PN2907 transistors 77, 82, 83, and 95, 1OK ohm resistors 78A, 78B and 78C, 2.2K ohm resistors 79A, 79B, and 79C, type TIL116 optoisolators 80A, 80B and 80C, and 3K ohm resistors 81A, 81B and 81C. Continuing at the lower-left-hand corner of FIG. 2, the parts of the preferred embodiment of the invention further include LEDs 87A through 87D, 820 ohm resistor 88, double pole single throw manual switch 89, alarm 90 which may be a commercially available alarm such as the SONALERT alarm manufactured by Emhart Industries, Inc., 820 ohm resistors 91A, 91B and 91C, type 1N914 diodes 92A, 92B and 92C, four circuit dip switch 93, 1OK ohm resistor 94, 0.1 microfarad capacitor 96, manual trip switch 97, electronic latch switch 98, type 1N4002 diodes 99A and 99B, relay 100, integrated circuit 110 which is preferably another type LM555 timer, 5 M ohm variable resistor 111, 1.0 microfarad capacitor 112, and 1OK ohm resistor 113. Terminals 101 are the outputs for the relay 100, which includes coil 1OOA and contacts 1OOB.

Turning now to the interconnections of the various parts of the circuitry, transformer 71, full-wave bridge rectifier 72, voltage regulator 76 and the associated circuitry provide the power supply for the system. Terminals 105 connect to a conventional 120 volt AC, 60 Hertz power source. Fuse 70 is connected between one line of the power source and one side of the transformer 71. The transformer 71 is connected across the input terminals of full-wave bridge rectifier 72. One output terminal of rectifier 72 is connected to ground and the other side is connected to the input of voltage regulator 76 and is also connected to ground through filter capacitor 73A and regulation diodes 74A and 74B. 30 ohm current limiting resistor 73B is connected between the output of bridge 72 and the cathode of diode 74A, while 15 ohm resistor 73C is connected between the cathodes of the two diodes. The cathode of diode 74B is also connected to the probe power output 30A. The output of voltage regulator 76 provides a positive 12 volt power supply for the rest of the electronic circuitry. The power supply line is connected to ground through filter capacitor 96.

The probe status signals input on terminals 30B through 30D are amplified by transistors 77, 82, and 83, and the associated circuitry. Terminal 30D is connected through 3K ohm resistor 91A to the number 1 pin of optoisolator 80A. The number 2 and number 4 pins of optoisolator 80A are grounded. The number 5 pin is connected to the base 77A of transistor 77 through current limiting resistor 79A. The base 77A is also connected to the positive voltage supply through pull-up resistor 78A. The emitter 77B of transistor 77 is connected to the positive voltage supply. The collector 77C of transistor 77 provides the non-polar liquid (oil) status signal and is connected to the positive side of variable resistor 41. Inputs 30B and 30C are similarly connected to their respective optoisolators and transistors. The output of collector 84 of transistor 82 provides the polar liquid (water) status signal which is input to the positive side of variable resistor 43, while the collector 85 of transistor 83 provides the dry condition status signal which is input to the positive side of variable resistor 44.

Variable resistors 41 through 44 and comparators 46 through 49 provide a reference means for setting the level of the signals indicating the presence of a polar liquid, the dry condition, the circuit power status, and the presence of a non-polar liquid, respectively. The side of variable resistor 41 not connected to the status signal is grounded while the wiper is connected to the positive or high input of comparator 49. The negative or low input of comparator 49 is connected to its output in a voltage follower mode. The other variable resistors and comparators are connected similarly. Note that variable resistor 42 and comparator 48 set the level which is used to indicate that the circuit power is on.

Timer 52 and its associated circuitry provide a clock means for producing a timing signal. The number 1 pin of timer 52 is grounded, and the number 8 and 4 pins are connected to the power supply. The numbers 2, 7 and 6 pins of timer 52 are connected to one side of the switch 93D through resistor 54, the other side of switch 93D through resistor 53, and to ground through capacitor 55. The number 3 pin provides the output timing signal which is applied to the number 14 pin of counter 61.

Counter 61, multiplexer 60, socket 31 and their associated circuitry provide an output means responsive to the timing signal for sequencing the dry condition signal, the non-polar liquid signal, the polar liquid signal, and the circuit power signal on a single output line. The number 4 pin of counter 61 is tied to the positive voltage supply while the number 11 pin is grounded. The number 13 and number 8 pins of counter 61 are connected together and are also connected to the number 10 input of multiplexer 60. The number 9 output pin of counter 61 is connected to the number 9 input pin of multiplexer 60. The number 1 and 2 pins of counter 61, which are the reset pins, are connected to the collector 77C of transistor 77. The number 16 pin of multiplexer 60 is connected to the positive power supply while the number 6, 7 and 8 pins are connected to ground. The number 1, 2, 4, and 5 pins of multiplexer 60 are connected to the outputs of comparators 49, 47, 46 and 48, respectively. The number 3 pin of multiplexer 60 is the output pin and it is connected to the serial output pin 32 of connector 31 through protective resistor 36E. Pin 33A of connector 31 is connected to ground while pin 33B is connected to the positive power supply through protective resistor 36A. Pins 34A, 34B, and 34C of connector 31 are connected to collectors 77C, 84, and 85 of transistors 77, 82 and 83, respectively through protective resistors 36D, 36B and 36C, respectively.

An audible output is provided by alarm 90, while a visible output is provided by LEDs 87A through 87D. One side of alarm 90 is connected to the positive voltage supply while the other side is connected to the pole of switch 89. The throw of switch 89 is connected to the base of transistor 95 through resistor 94. The cathodes of LEDS 87A through 87D are grounded. The anode of LED 87D is connected to the positive power supply through resistor 88 while the anodes of LED 87A through 87C are connected to the collectors 85, 84, and 77C of transistors 83, 82 and 87 respectively through current limiting resistors 91A through 91C, respectively.

Switches 93A, 93B and 93C, relay 100, timer 110, and the associated circuitry provide a programmable relay with a time delay feature. The throws of switches 93A through 93C are connected to the number 4 input pin of timer 110. Pin 4 is also connected to one side of manual trip switch 97, while the other side of manual trip switch is connected to the positive voltage supply. Further, the number 4 pin is tied to one side of latch switch 98 while the other side of latch switch 98 is connected to the collector of transistor 95. The emitter of transistor 95 is connected to the positive voltage supply. In addition, the number 4 pin of timer 110 is connected to one side of variable resistor 111, to the wiper of the variable resistor, to ground through resistor 113, and to the cathode of diode 99A. The number 2 and number 6 pins of timer 110 are connected together and connected to the other side of variable resistor 111, to the anode of diode 99A, and to one side of capacitor 112. The other side of capacitor 112 and the number 1 pin of timer 110 are grounded. The number 8 pin of timer 110 is connected to the cathode of diode 99B and to one side of the coil lOOA of relay 100. The number 3 pin of timer 110 is connected to the anode of diode 99B and to the other side of coil lOOA. The contacts of relay 100 are indicated at lOOB and the relay outputs are indicated at 101.

Turning now to the operation of the invention, the outputs of the probe assemblies, such as 14 and 16, (FIG. 1) are connected in parallel to cable 21 which is connected to inputs 30B through 30D. These inputs are normally at the nominal ground voltage. However, when a dry condition, a polar liquid, or a non-polar liquid, are detected, a positive voltage is placed on the corresponding status inputs 30B, 30C or 30D, respectively. The positive voltage will turn on the corresponding one of the transistors 83, 82, or 77, respectively. The voltage output on the collectors 85, 84 and 77C, respectively, when the transistors are turned on will vary depending on the number of probes in the system and other factors. When the system is manufactured, the variable resistors 41 through 44 are adjusted so that the outputs of the comparators 46 through 49 are at predetermined levels. In the preferred embodiment, variable resistor 41 is set so the output of comparator 49 (the non-polar liquid output) is at two volts when a non-polar liquid signal is received, variable resistor 42 is adjusted so that the output of comparator 48 (which is the power on output) is at a value of 5 volts, variable resistor 43 is adjusted so that the output of comparator 46 (which is the polar liquid output) is at a value of 1 volt, and variable resistor 44 is adjusted so that the output of comparator 47 (which is the dry condition output) is at a value of 3 volts. The multiplexer 60 multiplexes the output signals from comparators 46 through 49 and places them in sequence on the output pin 32 of connector 31. When switch 93D is in the open position, timer 52 will have a period of about 15 minutes, so that each of the different status signals will be output for a 15 minute period on pin 32 for a total cycle time for all the signals of one hour. If switch 93D is closed, then timer 52 will have an approximately 1½ second period so that each of the status signals will be output on pin 32 for a time of 1½ seconds for a total cycle time for all status signals of approximately six seconds. If a non-polar liquid is detected, the output of collector 77C applied to the reset pins 1 and 2 of counter 61 will hold the counter reset so that the non-polar liquid status will be continually output on pin 32. The non-polar liquid is generally the pollutant of principal interest.

Switches 93A, 93B and 93C and their associated circuitry provide a programmable output for the detector. The status signals for dry condition, polar liquid, and non-polar liquid, are input on switches 93A, 93B and 93C, respectively. Closing any one or more of the switches will cause the corresponding status signal to turn on timer 110. Once the timer delay, set by adjusting variable resistor 111, is complete, relay 100 is turned on. In addition, via its connection to relay 100, alarm 90 will be turned on. The alarm may be disengaged by the use of switch 89. The relay 100 and the alarm 90 may also be manually turned on by switch 97. Engagement of the relay also causes a signal to be applied to the base of transistor 95, which is turned on and, if switch 98 is closed, applies a signal to pin 4 of timer 110 to latch the relay in the on condition. Alarm 90 also will be latched on if switch 89 is engaged. Diodes 92A through 93C prevent the closing of switches 90A through 90C from lighting the front panel LEDs 87A through 87C.

The invention thus described, provides a parallel output, which has generally been provided in the prior art, on the pins 34A through 34C and 33B of the output connector 31. In addition, it provides a unique serial output on pin 32. This output signal is of a form that can be utilized easily by inexpensive recording means, such as a single channel chart recorder, to record the data necessary for tracking pollutants. Glancing at the output of such a chart recorder will immediately indicate if the unit is functioning and the status of the probes. If a non-polar pollutant has been detected at any time since the chart recorder was last checked, it will be immediately evident and the time of initiation of the polluting condition can be ascertained by checking back on the record.

A novel apparatus for detecting pollutants that provides an output that can be inexpensively utilized, and which has numerous other features has been described. It is evident that those skilled in the art may now make numerous uses and modifications of and departures from the specific embodiments described herein without departing from the inventive concepts. For example, the various electronic components can be replaced by equivalent electronic parts. While the invention has been described in terms of an embodiment which detects the presence of water, oil, or a dry condition the inventive concepts could be used in detecting other conditions, and in particular, the presence or absence of other non-polar liquids or polar liquids. Many other variations may be described. Consequently, the invention is to be construed as embracing each and every novel feature and novel combination of features present and/or possessed by the fluid detection apparatus described.

What is claimed is:

1. An apparatus for detecting the presence of fluids, comprising sensing means for sensing the presence of a polar liquid, a non-polar liquid, and a dry condition and for producing a polar liquid signal, a non-polar liquid signal, and a dry condition signal, each of said signals capable of assuming at least two levels, a first level indicative of the absence of the fluid or condition and a second level indicative of the presence of the fluid or condition;

reference means for setting said second level of said polar liquid signal to a first predetermined value, for setting said second level of said non-polar liquid signal to a second predetermined value, and for setting said second level of said dry condition signal to a third predetermined value;

clock means for producing a timing signal; and output means responsive to said timing signal for sequencing said polar liquid signal, said non-polar liquid signal, and said dry condition signal on a single output line.

2. The apparatus of claim 1 and further comprising locking means for locking said signal on said output line at said second predetermined value when said non-polar liquid is detected.

3. The apparatus of claim 1 and further comprising means for changing the frequency of said timing signal.

4. The apparatus of claim 1 and further including means for adjusting said first predetermined value, said second predetermined value, and said third predetermined value.

5. The apparatus of claim 1 and further comrpising means for providing an output signal indicative of the status of said electronic circuitry, said means including a reference means for setting said electronic status signal to a predetermined value.

6. The apparatus of claim 5 wherein said output means further comprises a means responsive to said timing signal for sequencing said electronic status signal with said polar liquid signal, said non-polar liquid signal and said dry condition signal on said single output line.

* * * * *